(12) United States Patent
Matsushita et al.

(10) Patent No.: US 7,952,527 B2
(45) Date of Patent: May 31, 2011

(54) IC TAG

(75) Inventors: Taiga Matsushita, Tokyo (JP); Naoki Hasegawa, Tokyo (JP); Takakazu Murakami, Tokyo (JP)

(73) Assignee: Lintec Corporation, Tokyo (JP)

( * ) Notice: Subject to any disclaimer, the term of this patent is extended or adjusted under 35 U.S.C. 154(b) by 468 days.

(21) Appl. No.: 11/990,216

(22) PCT Filed: May 2, 2006

(86) PCT No.: PCT/JP2006/309524
§ 371 (c)(1),
(2), (4) Date: Dec. 8, 2008

(87) PCT Pub. No.: WO2007/017978
PCT Pub. Date: Feb. 15, 2007

(65) Prior Publication Data
US 2009/0096706 A1 Apr. 16, 2009

(30) Foreign Application Priority Data
Aug. 10, 2005 (JP) .................................. 2005-232642

(51) Int. Cl.
*H01Q 1/38* (2006.01)
(52) U.S. Cl. .................................. 343/700 MS; 343/895
(58) Field of Classification Search .......... 343/700 MS, 343/895, 702; 359/296, 290, 291, 298; 235/487, 235/488, 492; 340/572.1–572.9, 568.1
See application file for complete search history.

(56) References Cited

U.S. PATENT DOCUMENTS

| | | | |
|---|---|---|---|
| 6,585,165 B1 * | 7/2003 | Kuroda et al. | 235/492 |
| 7,209,281 B2 * | 4/2007 | Takei | 359/296 |
| 7,768,405 B2 * | 8/2010 | Yamazaki et al. | 340/572.7 |

FOREIGN PATENT DOCUMENTS

| | | |
|---|---|---|
| JP | 10-39758 A | 2/1998 |
| JP | 2000-57292 A | 2/2000 |
| JP | 2000-90224 A | 3/2000 |
| JP | 2002-185281 A | 6/2002 |
| JP | 2004-195949 A | 7/2004 |

* cited by examiner

*Primary Examiner* — Hoang V Nguyen
(74) *Attorney, Agent, or Firm* — Birch, Stewart, Kolasch & Birch, LLP

(57) ABSTRACT

According to the present invention, there is disclosed an antenna circuit characterized by comprising:

a substrate, a surface circuit consisting of a planar coil circuit portion and at least one pair of opposed electrodes connected to the planar coil circuit portion formed on the substrate, at least one terminal for formation of broken line, formed in a conductor constituting the surface circuit, and a broken line which penetrates through the substrate and the surface circuit and which has, in the terminal for formation of broken line, at least one uncut part passing through the terminal for formation of broken line.

12 Claims, 7 Drawing Sheets

IC TAG

TECHNICAL FIELD

The present invention relates to a non-contact IC tag used in confirmation of individuals, merchandise management, physical distribution management, etc.

BACKGROUND ART

In recent years, there has been widely used non-contact IC tag which is attached to-be-controlled persons or goods (adherends) for control of the flow, circulation, etc. of such persons or goods. This IC tag can memorize data in the IC chip built therein. By allowing the IC tag to communicate in non-contact with an interrogator, the to-be-controlled data memorized in the IC chip can be exchanged with the interrogator.

As the application fields of IC tag, there are various fields, for example, communication tickets, control of human incoming or outgoing in business, stock control of goods, and control of physical distribution. IC tags of various forms have been produced so as to match such application fields.

Throw-away IC tag is fitted to, for example, goods and are placed at a shop together with the goods; when the goods have been sold, the data stored in the IC chip is read by an interrogator. At this timing, the role of the IC tag is over.

In the throw-away IC tag whose role has been over, the data stored in the IC chip remains if nothing is done. Therefore, the control of the data stored in the IC chip of used IC tag is important. For example, there may be considered a case that the IC tag (which was fitted to a goods and used properly) is peeled from the goods, the data stored in the IC chip is read, and this data is used illegally. It may be also considered that the data stored in the IC chip of discarded IC tag is falsified for illegal use.

In order to prevent such illegal use, there is a proposal on a method of deactivating an IC tag by generating an induced current in the resonance circuit constituting the IC tag, by using a deactivation machine which generates a high-output electric field (JP-A-2002-185281, paragraph No. 0002). In this deactivation method, however, there is a case that the ability of communication with interrogator is restored by the restoration of resonance ability, after the deactivation treatment. Further, there is a problem that, in this deactivation method, visual confirmation of deactivation is impossible.

There is also a proposal on an IC tag obtained by forming, in the substrate having an electronic circuit of IC tag formed thereon, portions of different peeling strengths (JP-A-2000-57292, claim 1). With this IC tag, when it is adhered to a goods, used, and then peeled from the goods for recovery, the electronic circuit of IC tag is destroyed. In the method of deactivating this IC tag, the destruction of electronic circuit takes place owing to the difference in peeling strength; therefore, stable control of peeling strength is necessary. Further, there is required a step of forming a peeling layer, which increase the number of steps of IC tag production.

DISCLOSURE OF THE INVENTION

The present inventors made a study in order to solve the above problems. In the course of the study, the present inventors thought of an IC tag in which a broken line (such as line of perforations formed by sewing machine) was formed in its electronic circuit, and applied for a patent (Japanese Patent Application No. 2004-195949). With this IC tag, when deactivation is made after the use, the electronic circuit is reliably destroyed along the formed broken line. As result, the IC tag can be deactivated reliably. Further, it was learned that the step of broken line formation can be contained in a step of IC production, i.e. a step of cutting a size of tags into individual tags and, therefore, no independent step is required for formation of a broken line. Furthermore, this IC tag requires no special apparatus for deactivation and has an advantage that the deactivation of IC tag can be confirmed visually.

With this IC tag, however, there is a risk that, when the processing accuracy in the process of IC tag production is low, the electronic circuit is destroyed in formation of broken line. In such a case, the IC tag produced has low reliability.

The present inventors made a study in order to solve the above problem. As a result, the present inventors thought of forming a terminal for formation of broken line, in the wiring of electronic circuit and further forming a broken line in the terminal. With this approach, the processing accuracy needed in formation of broken line can be reduced greatly. It was further found that this formation of terminal can be conducted simultaneously in the process of circuit production without employing any additional step.

The present invention has been completed based on the above study and finding. The present invention aims at providing an IC tag which can be produced by a simplified process, can be reliably deactivated in the use, and can be deactivated without using any special apparatus.

The present invention, which has achieved the above aim, is as described below.

[1] An antenna circuit characterized by comprising:
a substrate,
a surface circuit consisting of a planar coil circuit portion and at least one pair of opposed electrodes connected to the planar coil circuit portion formed on the substrate,
at least one terminal for formation of broken line, formed in a conductor constituting the surface circuit, and
a broken line which penetrates through the substrate and the surface circuit and which has, in the terminal for formation of broken line, at least one uncut part passing through the terminal for formation of broken line.

[2] The antenna circuit according to [1], wherein the conductor in which the terminal for formation of broken line is formed, is at least one pair of leads connecting each opposed electrode and the planar coil circuit portion, the terminal for formation of broken line is formed in the leads, and there is formed, in the terminal for formation of broken line, a closed broken line having at least one uncut part passing through the terminal for formation of broken line.

[3] The antenna circuit according to [1], wherein the terminal for formation of broken line is formed in a shape having a dimension which can contain therein a circle having a diameter of at least 1 mm.

[4] The antenna circuit according to [1], wherein the broken line has an uncut part having a length of 0.08 to 1.5 mm.

[5] An IC inlet characterized by comprising:
the antenna circuit set forth in any one of [1] to [4], and
an IC chip connected to the opposed electrodes of the antenna circuit.

[6] An IC tag characterized by comprising:
the IC inlet set forth in [5], and
an adhesive layer formed on the side of which the surface circuit is formed on the substrate of the IC inlet, and/or on the opposite side.

[7] The IC tag according to [6], wherein the adhesive layer is formed on the area other than the area in which the closed broken line is formed.

[8] The IC tag according to [7], wherein the adhesive layer is formed on at least part of the area which is formed in the closed broken line.

[9] The IC tag according to [6], wherein the adhesive layer is formed on at least the planar coil circuit portion area of the substrate and also on at least part of the periphery of the residual area of the substrate.

[10] The IC tag according to [9], wherein the adhesive layer is formed on at least part of the closed broken line portion of the substrate.

[11] An IC tag comprising:
the IC tag according to any one of [6] to [10], and
a surface protective layer formed on the surface-circuit-formed side of the IC tag or on its opposite side, wherein the broken line penetrates through the surface protective layer.

[12] The IC tag according to [11], wherein the surface protective layer has printability.

In the present invention, a terminal for formation of broken line is formed in the circuit of IC tag and a broken line is formed in the terminal; therefore, the processing accuracy needed in the formation of broken line can be reduced. As a result, IC tag can be mass-produced and the IC tag produced can be operated at high reliability. Further, when the IC tag of the present invention is provided with an adhesive layer at the back side and the adhesive layer is provided (coated) in a given constitution, the resulting IC tag can be deactivated more reliably after the use.

By, in production of the present IC tag, allowing the step of formation of broken line be contained in the step of cutting a size of tags into individual tags, the broken line can be formed without increasing the number of IC tag production steps.

In deactivation of the IC tag of the present invention, existence or nonexistence of the area by cutting out along the broken line can be confirmed visually; therefore, the deactivation of IC tag can be confirmed simply and reliably.

In these figures, 2 is a substrate; 2A is one side of substrate; 2B is other side of substrate; 4 is an outer taking-out electrode; 6 is a planar coil circuit portion; 8 is an inner taking-out electrode; 10 is an insulating layer; 12 is a jumper; 14 is one lead; 16 is one opposed electrode; 18 is other opposed electrode; 19 is an outer end; 20 is other lead; and 22 is an IC chip.

24, 26 and 62 are each a terminal for formation of broken line; P is a width of terminal; Q is a length of terminal; 28, 64, 74, 98 and 99 are each a broken line; 30 and 30a are each a closed area; 31 is other area; 32 is a cut part of broken line; and 34 is an uncut part of broken line.

X is a length of cut part; Y is a length of uncut part; 71, 81, 101 and 111 are each a one point broken line; a and b are each a length of broken line; 54 and 75 are each a release material; and 78 is a surface protective layer.

52, 72, 76, 82, 102, 112, 122 and 132 are each an adhesive layer; 84, 184 and 284 are each a ribbon-shaped adhesive layer; 92 and 94 are each a surface material; 104, 106, 114 and 116 are each a peripheral adhesive layer; 118 is an end adhesive layer; 100 is an antenna circuit; and 110 and 120 are each an IC inlet.

130, 140, 150, 160, 170, 180, 190, 200, 210, and 220 are each an IC tag; and 204 is a resin layer.

BEST MODE FOR CARRYING OUT THE INVENTION

Hereinafter, embodiments of the present invention are described with reference to the drawings.

(Antenna Circuit)

Figure 1:
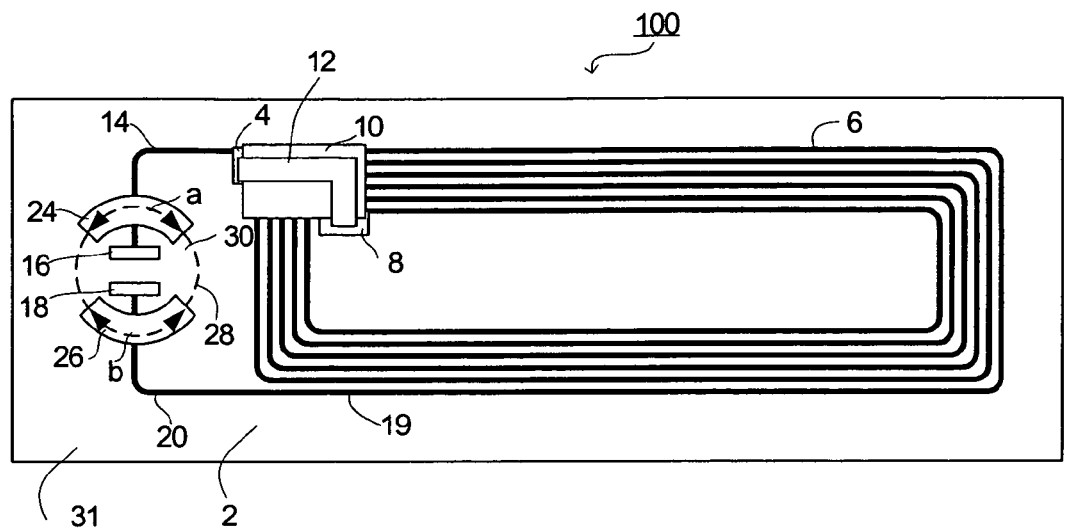
FIG. 1 is a plan view showing a constitution of the antenna circuit of the present invention.

FIG. 1 is a plan view showing an example of the antenna circuit of the present invention.

In FIG. 1, 100 is an antenna circuit and 2 is a substrate. The substrate 2 functions as a support for a planar coil circuit portion, an IC chip, etc., which are described later.

As the substrate 2, there are preferably used a paper (e.g. wood-free paper or coated paper), a synthetic resin film, etc. As to the resin material constituting the synthetic resin film, there is no particular restriction, and there are mentioned, for example, polyethylene, polypropylene, polyvinyl chloride, polystyrene, polyester, polyvinyl acetate, polybutene, polyacrylic acid ester, polymethacrylic acid ester, polyacrylonitrile, polyimide, polycarbonate, polyamide, ethylene-vinyl acetate copolymer, polyvinyl acetal, polyethylene terephthalate, and acrylonitrile-butadiene-styrene copolymer.

The thickness of the substrate 2 is preferably 10 to 200 μm, particularly preferably 25 to 125 μm.

An outer taking-out electrode 4 is formed in the vicinity of one corner of the substrate 2.

6 is a planar coil circuit portion and is formed in a rectangular, spiral shape on one side of the substrate 2. The outer taking-out electrode 4 and the planar coil circuit portion 6 are formed apart from each other. An inner end of the planar coil circuit portion 6 is connected to an inner taking-out electrode 8.

In an area extending from the vicinity of the outer taking-out electrode 4 to the vicinity of the electrode 8, an insulating layer 10 is formed so as to cover the upper surface of the planar coil circuit portion 6. The inner taking-out electrode 8 at the inner end of the planar coil circuit portion 6 and the outer taking-out electrode 4 are electrically connected to each other via a jumper 12 formed on upper of the insulating layer 10. However, the jumper 12 is insulated from the planar coil circuit portion 6 by the insulating layer 10.

Figure 2:
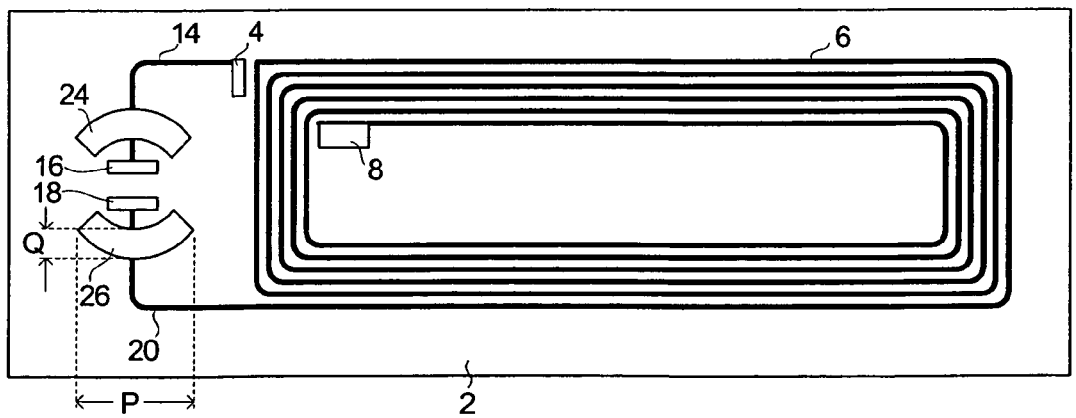
FIG. 2 is a view explaining the process for production of the antenna circuit of FIG. 1.

FIG. 2 is showing a circuit pattern when, in FIG. 1, neither insulating layer 10 nor jumper 12 is formed.

The outer taking-out electrode 4 and one opposed electrode 16 are connected to each other via one lead 14.

Other opposed electrode 18 is formed apart by a given distance from the one opposed electrode 16.

The other opposed electrode 18 is connected to an outer end 19 of the planar coil circuit portion 6 via other lead 20.

In the leads 14 and 20 are formed one pair of terminals for formation of broken line 24 and 26, each formed in an appropriate fan shape. The terminals for formation of broken line 24 and 26 are formed so that, as shown in FIG. 2, the width P thereof is larger than the line width of the leads 14 and 20 and is preferably 1 to 20 mm. The length Q thereof is preferably 1 mm or more, particularly preferably 1 to 20 mm in view of the processing accuracy, etc. The terminals for formation of broken line 24 and 26 are formed so as to surround an IC chip 22 (described later) and are electrically connected to one pair of leads 14 and 20.

In FIG. 1, 28 is a broken line such as line of perforations formed by sewing machine, passes through the one pair of terminals for formation of broken line 24 and 26, and is formed in an approximately circular shape surrounding an IC chip described later. By closed broken line 28 formed as this circular, a closed area 30 formed inside the broken line 28 is divided from other area 31 of antenna circuit 100.

Incidentally, the cuts of the broken line 28 are formed so as to penetrate through the terminals for formation of broken line 24 and 26 and the substrate 2.

Generally, in mass production, a large number of antenna circuits are produced in one lump and then cut into each individual antenna circuit 100. It is preferred that the broken line 28 is formed in this cutting operation, using a punching blade which enables formation of a broken line such as line of perforations formed by sewing machine.

As shown in FIG. 1, the lengths a and b of broken line when passing through the terminals for formation of broken line 24 and 26 are each preferably 1 mm or more, more preferably 1 to 20 mm. When the lengths a and b of broken line are each less than 1 mm, the response sensitivity of IC tag may be low.

Figure 3:
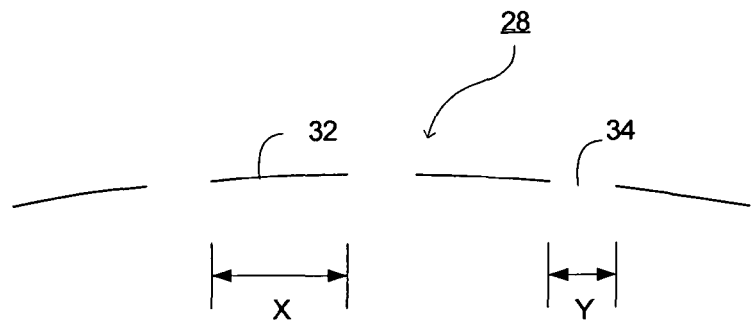
FIG. 3 is an enlarged view showing an example of broken line.

FIG. 3 is a partly enlarged view of the broken line 28. This broken line 28 consists of cut parts 32 (length of each cut part: X) and uncut parts 34 (length of each uncut part: Y).

In the broken line 28, the ratio of the length Y of uncut part and the length X of cut part is preferably 1:1 to 1:20, more preferably 1:2 to 1:15.

The length Y of uncut part, of the broken line 28 is preferably 0.08 to 1.5 mm, more preferably 0.2 to 1 mm, further preferably 0.4 to 0.8 mm. When the length Y of uncut part is less than 0.08 mm, accurate formation of each uncut part 34 is difficult and breakage of uncut parts tends to occur. When the length Y of uncut part is more than 1.5 mm, reliable breakage of IC tag circuit may be unlikely to occur in the deactivation operation of IC tag, described later.

In the present invention, the above-mentioned taking-out electrodes 4 and 8, planar coil circuit portion 6, one opposed electrode 16, other opposed electrode 18, jumper 12, leads 14 and 20, and terminals for formation of broken line 24 and 26 constitute the electronic circuit of IC tag, and hereinafter they are generically called "surface circuit".

The surface circuit is formed, on one side of the substrate 2, with a conductive metal (e.g. gold, silver, copper or aluminum) or with a conductive paste (e.g. silver paste) or a conductive ink. For formation of the surface circuit, there can be employed any of ordinary methods for production of electronic circuit, such as a method of producing a surface circuit by screen printing with a conductive paste or a conductive ink and a method of forming a pattern of surface circuit by etching using a resist or the like.

The method of forming a surface circuit using a resist includes, as a specific example, a method of using a laminate film obtained by laminating a copper foil with a polyethylene terephthalate film. In this method, first, a resist pattern for formation of surface circuit is printed on the copper foil side of the laminate film, then the copper foil is subjected to etching, to remove unnecessary copper foil portions, whereby a surface circuit is formed.

Part of the surface circuit may be formed by a different method. For example, it is possible to remove unnecessary copper foil portions by etching to form a planar coil circuit portion and then separately form terminals for formation of broken line 24 and 26, with a silver paste or the like. Incidentally, the thickness of the surface circuit is preferably 5 to 100 μm, particularly preferably 10 to 50 μm.

In the present invention, as shown in FIG. 1, the substrate 2 and the surface circuit formed on at least one side of the substrate 2 are generally called "antenna circuit 100". The antenna circuit 100 has yet no IC chip 22 mounted thereon and, as described later, becomes an IC inlet (explained next) when an IC chip is mounted thereon.

Incidentally, there was explained, in the above, a case in which one pair of opposed electrodes are formed. However, there may be other constitution in which a plurality of opposed electrodes are formed and they are connected to intermediate sites of the coil constituting the planar coil circuit portion. In such a constitution, an IC chip is mounted to any one of the plurality of opposed electrodes, whereby the length of connected coil can be changed and the inductance of coil can be changed as desired. It is also possible to form a through-hole in the substrate and form a jumper via the through-hole on the each opposite sides of the substrate. It is further possible to form a surface circuit on both sides of the substrate.

(IC inlet)

Figure 5:
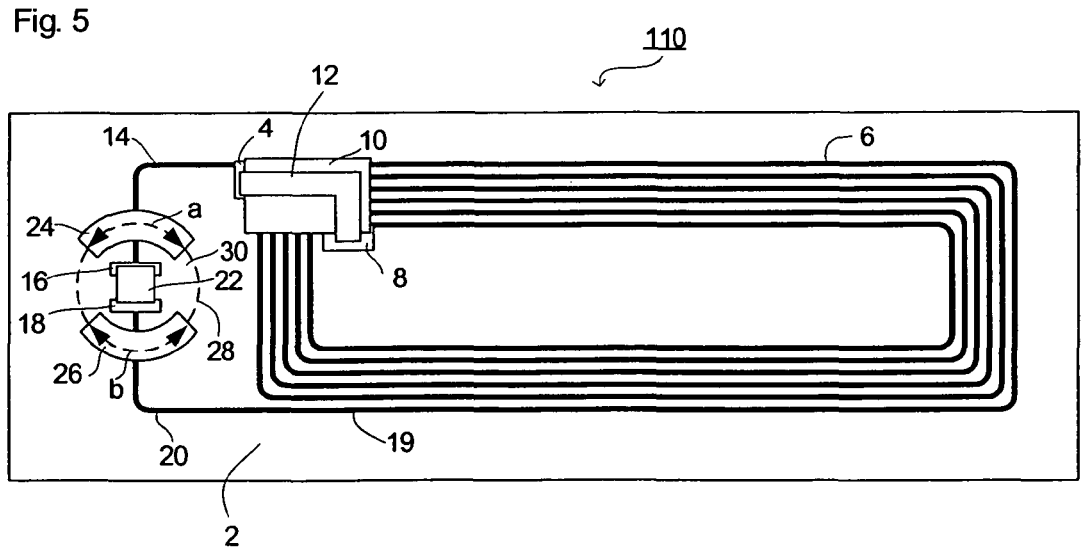
FIG. 5 is a plan view showing an example of the IC inlet of the present invention.

FIG. 5 is a plan view showing an example of IC inlet 110. An IC chip 22 is mounted to the opposed electrodes 16 and 18 of the antenna circuit 100 shown in FIG. 1. The IC chip 22 and the two opposed electrodes 16 and 18 are electrically connected to each other.

Mounting of the IC chip 22 is conducted, for example, by coating or attaching an adhesive material such as anisotropic conductive adhesive (ACP) or the like on or onto the opposed electrodes of surface circuit, fitting a wire bumper or a plating bumper to an IC chip, and fitting the IC chip to the opposed electrodes of surface circuit. As the method for fixing the IC chip, there can be mentioned, for example, thermocompression bonding.

Regardless of the above explanation, the constitution of the antenna circuit 100 or the IC inlet 110 may be changed in various ways as long as there is no deviation from the gist of the present invention. For example, there is no particular restriction as to the shape of terminals for formation of broken line 24 and 26 and they can be formed in any shape such as circle, rectangle, triangle and any desired shape.

There is no particular restriction, either, as to the size of terminals for formation of broken line 24 and 26. However, it is preferred that they have such a size that they can contain therein a circle of at least 1 mm in diameter, in view of the ordinary processing accuracy of production process. The number of to-be-formed terminals for formation of broken line has no restriction, either, and at least one terminal for formation of broken line on any selected conductor is formed sufficient.

Figure 6:
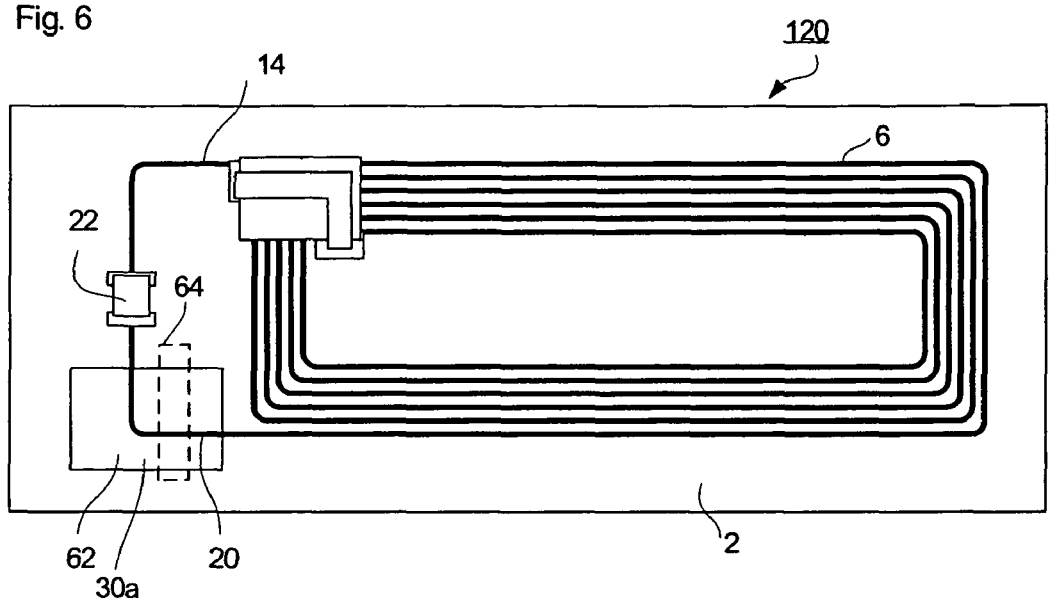
FIG. 6 is a plan view showing other example of the IC inlet of the present invention.

The broken line need not always be a curved line. It may be a straight line as in the IC inlet 120 of FIG. 6. FIG. 6 shows other example of the IC inlet of the present invention. In this example, one rectangular terminal for formation of broken line 62 is formed only in other lead 20. A broken line 64 is formed in a closed, rectangular shape which divides the terminal for formation of broken line 62 into two areas.

In the present invention, the IC inlet is further processed and the processed IC inlet is generically called "IC tag".

(IC Tag of First Form)

Figure 7:
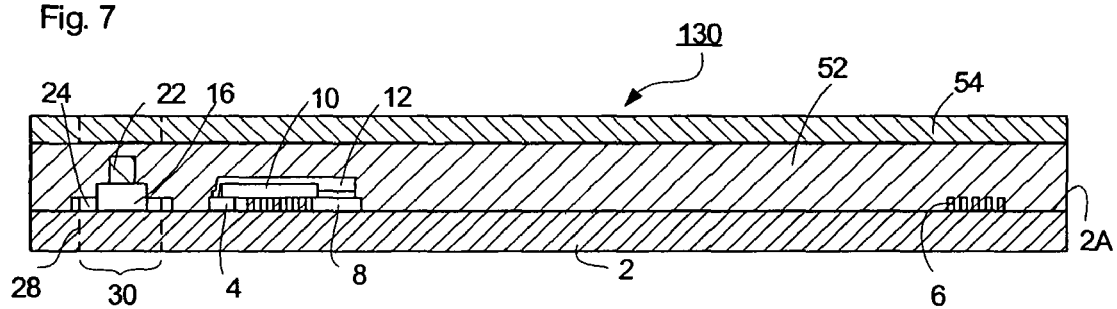
FIG. 7 is a side sectional view showing an example of the IC tag of the present invention.

FIG. 7 is a side sectional view showing an example of the IC tag of first form. In FIG. 7, 130 is an IC tag formed in a label shape. This IC tag 130 has an IC inlet 110 shown in FIG. 5 and an adhesive layer 52 which is formed so as to cover the substrate 2 of IC inlet 110 and the surface circuit and IC chip 22 both formed on one side 2A of the substrate 2. On the adhesive layer 52 is attached a release material 54 peelably.

In the present invention, "adhesive" is a concept including an ordinary adhesive and a pressure-sensitive adhesive.

As the adhesive used in the adhesive layer 52, there can be used any known adhesive. As specific examples, there can be mentioned acrylic adhesive, urethane-based adhesive, natural rubber- or synthetic rubber-based adhesive, silicone resin-based adhesive, polyolefin-based adhesive, polyester-based adhesive, and ethylene-vinyl acetate-based adhesive.

As the adhesive layer 52, there can be used an adhesive of double face adhesive tape type in which an adhesive is provided on both sides of an intermediate material (not shown) which is used as a core. The intermediate material can be selected from those shown as examples of the substrate 2. The adhesive can be selected from those shown as examples in the above adhesive layer 52. In this case, it is preferred that the adhesive layer 52 is laminated on the IC inlet and then a broken line 28 is formed. The broken line 28 is required to penetrate also through the intermediate material.

Formation of the adhesive layer 52 is conducted, for example, by coating an adhesive on the side on which release treatment of the release material 54, and then laminating the resulting adhesive layer 52 onto the side (2A) of the substrate 2 on which the surface circuit has been formed. The amount of the adhesive coated is preferably 5 to 100 g/m$^2$, particularly preferably 5 to 50 g/m$^2$.

As the release material 54, any release material can be used. There can be used, for example, one obtained by using, as a base material, a film made of a resin (e.g. polyethylene terephthalate, polybutylene terephthalate, polyethylene, polypropylene or polyarylate), or a paper (e.g. polyethylene-laminated paper, polypropylene-laminated paper, clay-coated paper, resin-coated paper or glassine paper) and, as necessary, subjecting the side of the base material to be contacted with the adhesive layer, to a release treatment. In this case, as an example of the release treatment, there can be mentioned formation of a release layer made of a release agent such as silicone-based resin, long chain alkyl-based resin, fluorine-based resin or the like. The thickness of the release material is not particularly restricted and can be selected appropriately.

Coating method of an adhesive on the release material 54 can be conducted, for example, by coating an adhesive with an air knife coater, a blade coater, a bar coater, a gravure coater, a roll coater, a curtain coater, a die coater, a knife coater, a screen coater, a Meyer bar coater, a kiss coater or the like, followed by drying.

Next, the way of using the IC tag is described on a case of using the IC tag 130 shown in FIG. 7.

First, the release material 54 of IC tag 130 is released from the adhesive layer 52 and the resulting IC tag is attached to an adherend (not shown) which is an object to be data-controlled. In this state, the adherend is subjected to circulation, etc., after which the data in the IC chip 22 of IC tag 130 is referred to by an interrogator and an intended data control is conducted. Thereby, the role of data control of this IC tag 130 is over.

Then, the IC tag attached to the adherend is released from the adherend and discarded. In this case, since the IC tag has a broken line 28 formed beforehand, the substrate 2, leads 14 and 20, and terminals for formation of broken line 24 and 26 are cut off along the broken line surrounding the IC chip 22, and the closed area 30 including the IC chip remains in the adherend. As a result, the electronic circuit formed on the substrate 2 is destroyed and the IC tag is deactivated reliably.

The closed area 30 including the IC chip, remaining in the adherend is small; therefore, even if this closed area 30 is attached again to the original IC tag, restoration of electronic circuit is impossible substantially. Therefore, deactivation operation is carried out reliably and restoration of IC tag function is impossible.

In the above way of use, the portion of IC tag other than IC chip was peeled from the adherend and the closed area 30 including the IC chip was allowed to remain in the adherend. The way of IC tag use is not restricted thereto. That is, it is possible to cut off the closed area 30 including the IC chip, along the broken line 28 and peel it from the adherend. In this case, since the IC chip remains at hand, there is no fear that the data stored in the IC chip is falsified by others and high safety is promised.

The IC tag produced using the IC inlet 120 shown in FIG. 6 is as well used in the same way. In this case, however, since the IC chip 22 is not included inside the closed area 30a formed by the broken line 64, the IC chip 22 is present together with the substrate even after deactivation operation.

Figure 8:
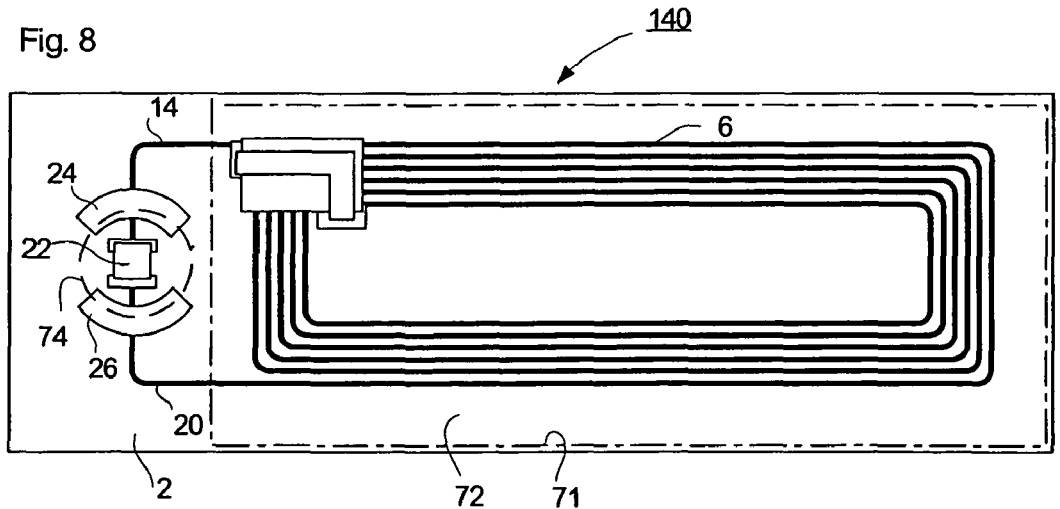
FIG. 8 is a plan view showing other example of the IC tag of the present invention.

FIG. 8 shows still other example of the IC tag of the present invention. In this example of IC tag 140, an adhesive layer 72 whose area is shown by a one point broken line 71, is formed only in the vicinity of a planar coil circuit portion 6 of a surface circuit formed on one side of a substrate 2. The adhesive layer 72 is not formed in the vicinity of an IC chip 22. The constitution in which the adhesive layer 72 is formed in the vicinity of the planar coil circuit portion, makes easy the recovery of the IC chip 22. Incidentally, 74 is a broken line and other numerical symbols refer to the same constitutions as above.

Figure 9:
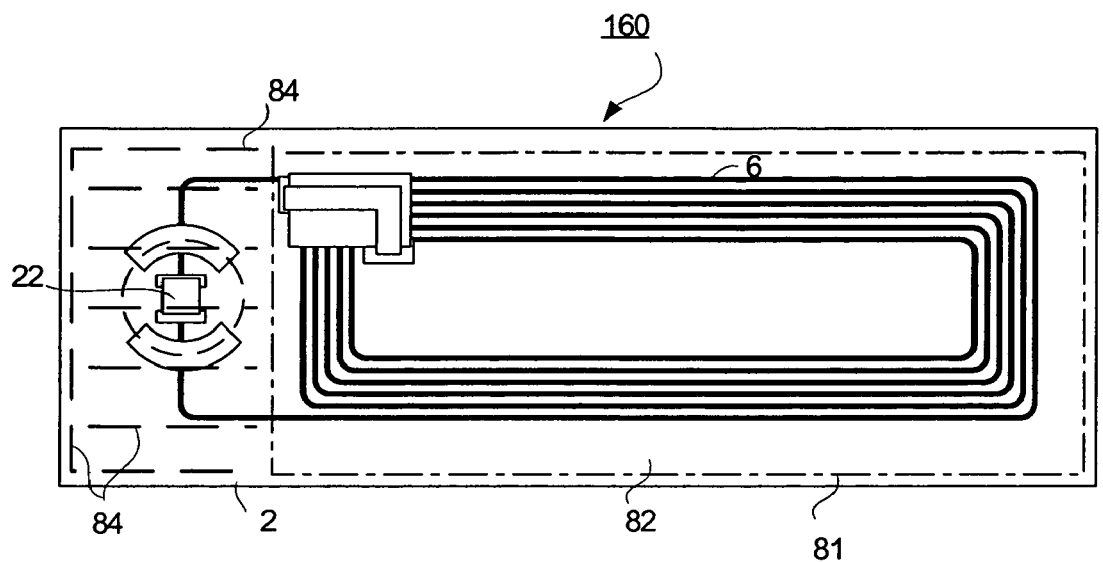
FIG. 9 is a plan view showing still other example of the IC tag of the present invention.

FIG. 9 shows still other example of the IC tag of the present invention. In this example of IC tag 150, an adhesive layer 82 whose area is shown by a one point broken line 81, is formed in the vicinity of a planar coil circuit portion 6. In an area surrounding an IC chip 22, adhesive layers are formed in at least part of the area, that is, partially (in FIG. 9, a plurality of ribbon-shaped adhesive layers 84 are formed). The shape of these adhesive layers formed partially is not restricted particularly, and there can be employed any shape selected from dot, lattice, straight line, etc.

There is no particular restriction, either, as to the areal ratio of the area in which the adhesive layers are formed and the area in which no adhesive layer is formed, and any ratio can be employed. By thus forming the adhesive layers 84 partially and temporally fixing the IC chip to an adherend with lower adhesion than the other portion of IC tag, the recovery of IC chip 22 can be conducted easily.

Figure 10:
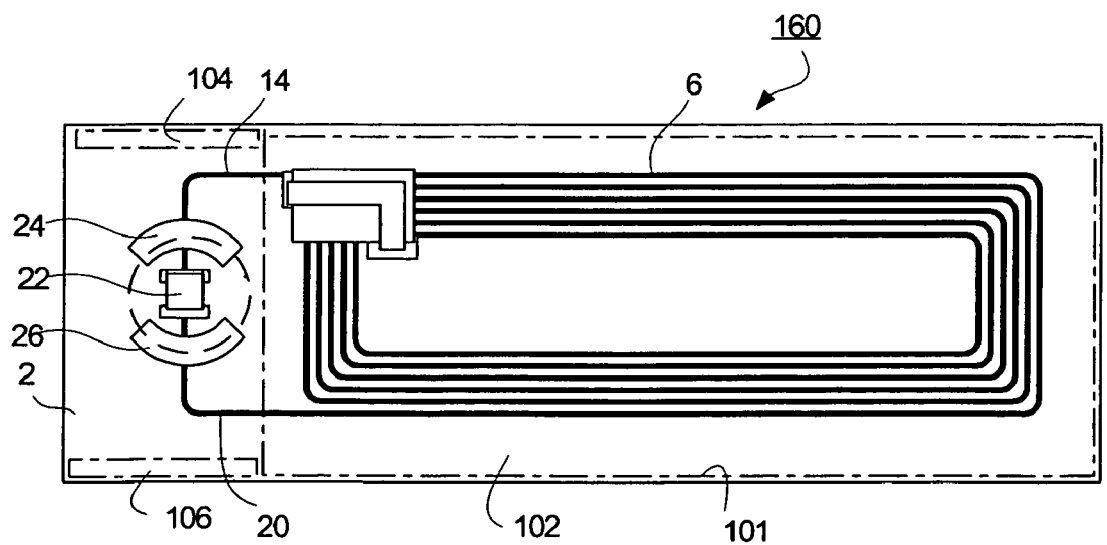
FIG. 10 is a plan view showing yet other example of the IC tag of the present invention.

FIG. 10 shows still other example of the IC tag of the present invention. In this example of IC tag 160, an adhesive layer 102 whose area is shown by a one point broken line 101, is formed in the vicinity of a planar coil circuit portion 6. In an area of a substrate 2 where an IC chip 22, leads 14 and 20, and terminals for formation of broken line 24 and 26 are formed, peripheral adhesive layers 104 and 106 are formed along the widthwise peripheries of the substrate. By thus forming the peripheral adhesive layers 104 and 106 partially, the recovery of IC chip can be conducted easily.

Figure 11:
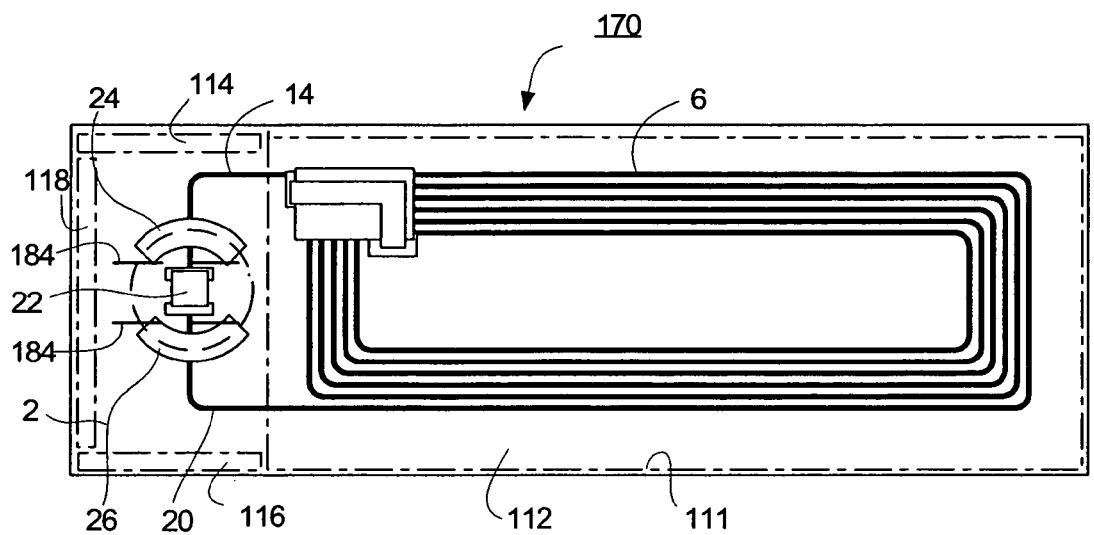
FIG. 11 is a plan view showing yet other example of the IC tag of the present invention.

FIG. 11 shows still other example of the IC tag of the present invention. In this example of IC tag 170, an adhesive layer 112 whose area is shown by a one point broken line 111, is formed in the vicinity of a planar coil circuit portion 6. Meanwhile, in the vicinity of an IC chip 22, two ribbon-shaped adhesive layers 184 and 184 are formed so that the IC chip 22 is sandwiched between the layers. Further, in the area of substrate where the IC chip 22, leads 14 and 20 and terminals for formation of broken line 24 and 26 are formed, there are formed peripheral adhesive layers 114 and 116 and an end adhesive layer 118. By thus forming adhesive layers partially, the IC chip can be left in a tentatively fixed state on an adherent when the IC tag is peeled from an adherend, and the recovery of IC chip can be conducted easily.

Figure 12:
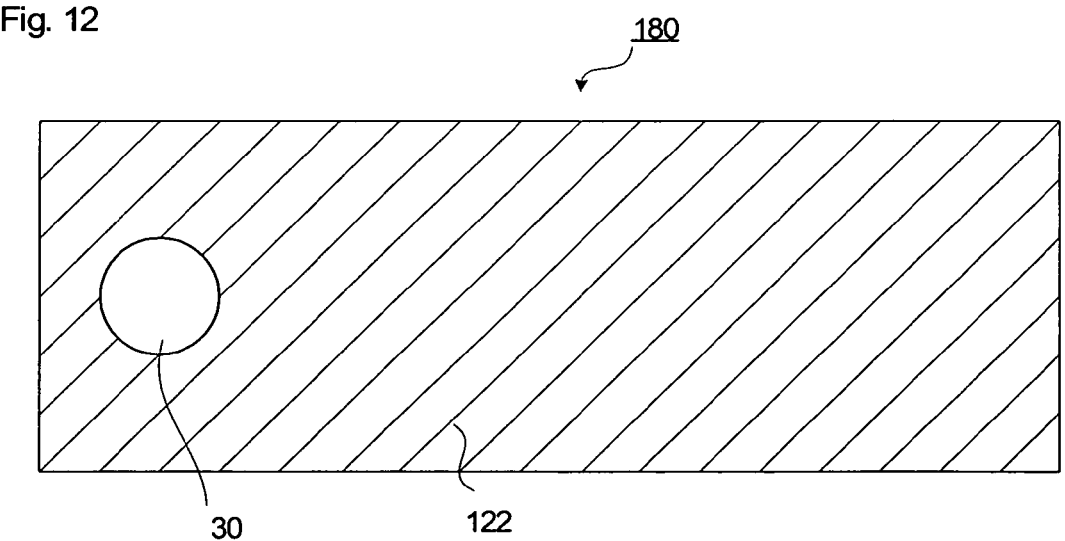
FIG. 12 is a back side view showing an example of the area formed adhesive layer of the IC tag of the present invention.

FIG. 12 shows still other example of the adhesive layer formed in the IC tag of the present invention. In an IC tag 180 shown in this example, no adhesive layer is formed in a closed area 30 where an IC chip is fitted. An adhesive layer 122 is formed in an area other than the closed area 30 in side of which the IC chip is fitted. By thus forming an adhesive layer partially, the recovery of the IC chip (not shown) present in the closed area 30 can be conducted easily.

Figure 13:
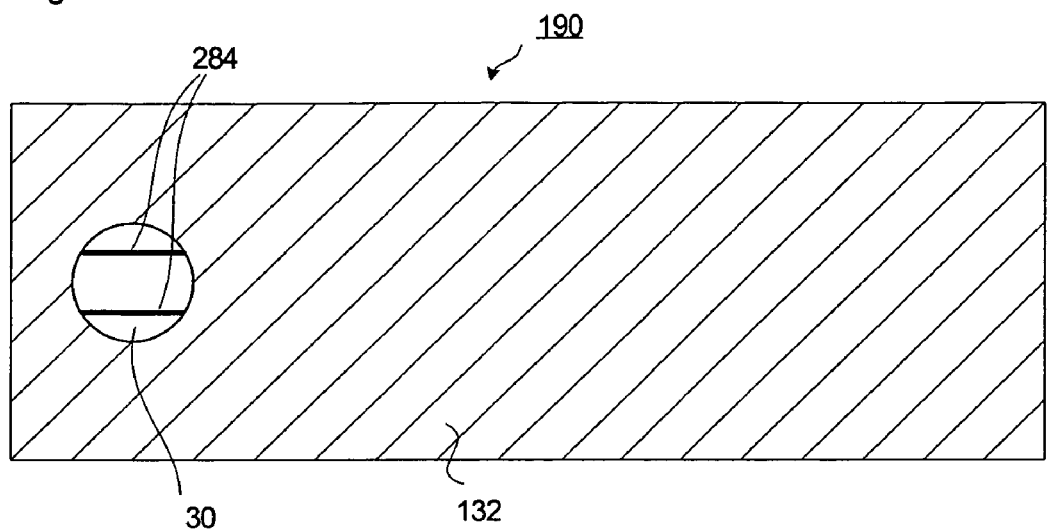
FIG. 13 is a back side view showing other example of the area formed adhesive layer of the IC tag of the present invention.

FIG. 13 shows still other example of the adhesive layer formed in the IC tag of the present invention. In an IC tag 190 of this example, two ribbon-shaped adhesive layers 284 and 284 are formed in a closed area 30 where an IC chip is fitted. Further, an adhesive layer 132 is formed in an area other than the closed area 30. By thus forming an adhesive layer partially, the IC chip (not shown) present in the closed area 30 can be left in a state that it is tentatively fixed to an adherend, and the recovery of IC chip can be conducted easily.

Figure 14:
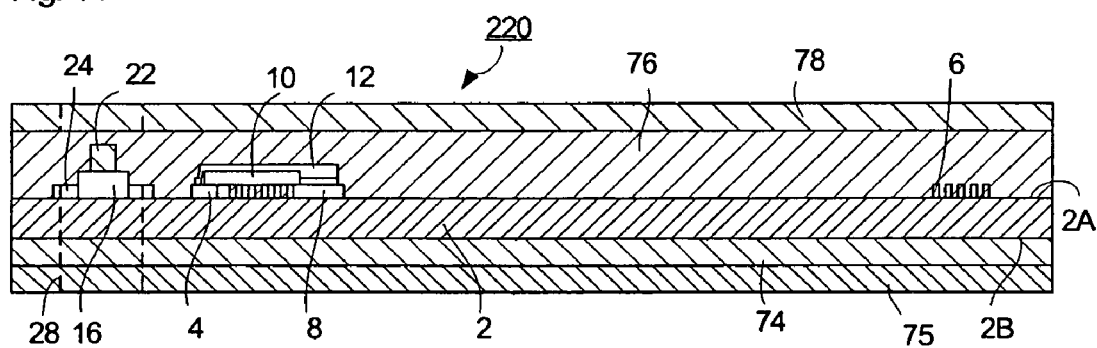
FIG. 14 is a plan view showing other example of the IC tag of the present invention.

FIG. 14 shows a yet different example of the IC tag of the first form. In this example, an adhesive layer 74 is formed on other side 2B of a substrate 2, opposite to one side on which a planar coil circuit portion 6 and an IC chip are mounted. 75 is a release material attached to the adhesive layer 74; 76 is an adhesive layer formed on the side 2A of the substrate 2; 78 is a surface protective layer laminated on the adhesive layer 74.

As the surface protective layer 78, there is used the same paper, resin film, resin sheet or the like, as used in the substrate 2.

The surface protective layer is preferred to be a substrate having printability. Or, the surface protective layer may have been subjected to a printability treatment at the surface. As the surface protective layer which has been subjected to a printability treatment, there can be mentioned, for example, a surface protective layer on which an ink accepting layer has been formed. The ink accepting layer per se can be formed by a known method.

The broken line is required to penetrate even through the surface protective layer.

Incidentally, the pattern of formation of the adhesive layer 74 may be the pattern described with reference to FIGS. 8 to 13.

(IC Tag of Second Form)

The IC tag of the present invention may also be constituted as follows.

That is, in the second form, an IC inlet is accommodated in a bag-shaped surface protective layer and is made into a card shape. In this form, unlike the first form, there is a case containing no adhesive layer.

Figure 15:
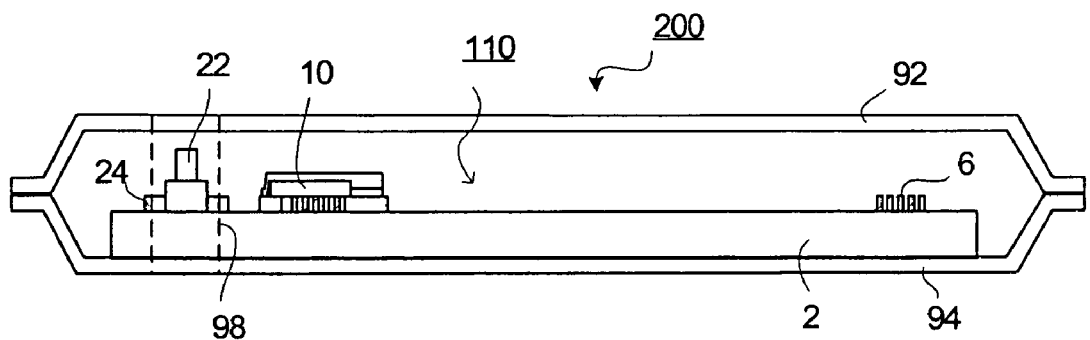
FIG. 15 is a side view showing an example of a different form of the IC tag of the present invention.

FIG. 15 shows an IC tag of the second form. In this example, an IC tag is formed in the shape of IC card.

An IC tag 200 of the second form is constituted by enclosing an IC inlet 110 shown in FIG. 5 between two surface materials 92 and 94. A circular broken line 98 is formed so as to penetrate through the surface material 92, the IC inlet 110 and the surface material 94. As the surface materials 92 and 94, there can be used the same material as used in the substrate 2.

Deactivation of this IC card is conducted by pressing the IC card along the broken line 98 to cut the circuit.

In this form as well, the shape of broken line and others are the same as in the first form; therefore, the same numerical symbols are used for the same portions and no explanation therefor is made.

Figure 16:
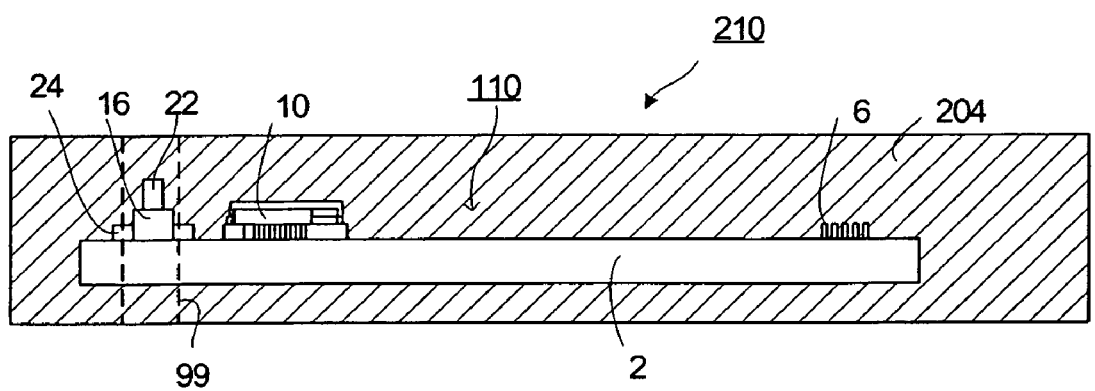
FIG. 16 is a side view showing other example of different form of the IC tag of the present invention.

FIG. 16 shows other example of the IC tag of the second form. In this example, an IC tag 210 of IC card shape is constituted using an IC inlet 110 shown in FIG. 5.

The both sides of the IC inlet 110 are covered with a resin layer 204 and a card shape is formed. The resin layer 204 functions as a surface protective layer of the IC inlet 110.

The resin layer 204 is preferred to be formed by injection molding. As the conditions of the injection molding, known conditions of injection molding may be used. As the resin used in the resin layer 204, there are preferred thermoplastic resins such as polyethylene terephthalate, polycarbonate, polyacrylonitrile-butadiene-styrene, polyethylene, polypropylene and the like.

In this example, a broken line 99 penetrates through the resin layer 204, terminals for formation of broken line 24 and 26 (not shown) and a substrate 2 and is formed in an approximately cylindrical shape.

EXAMPLES

Example 1

An IC inlet shown in FIG. 5 was produced and, using the IC inlet, an IC tag shown in FIG. 7 was produced by a procedure described below.

First, there was prepared a composite sheet [NIKAFLEX (trade name) produced by NIKKAN INDUSTRIES Co., Ltd., Cu/PET=35 µm/50 µm] which is made by laminating a copper foil and a polyethylene terephthalate film (PET). On this sheet was printed, by screen printing, a resist pattern for formation of outer taking-out electrode 4, planar coil circuit portion 6, inner taking-out electrode 8, opposed electrodes 16 and 18, leads 14 and 20 and terminals for formation of broken line 24 and 26. The resulting sheet was subjected to etching to remove unnecessary copper foil portions, whereby a unified wiring pattern shown in FIG. 2 was produced.

The line width of the circuit was 0.2 mm.

Then, between the outer taking-out electrode 4 and the inner taking-out electrode 8, an insulating layer 10 was formed so as to cover the planar coil circuit portion 6, by using an insulating resist ink (ML 25089 produced by ACHESON JAPAN Limited). Further, the outer taking-out electrode 4 and the inner taking-out electrode 8 were connected to each other by a jumper 12, using a silver paste (DW 250 L-1 produced by TOYOBO Co., Ltd.). Screen printing was used for formation of the insulating layer 10 and the jumper 12.

On the produced circuit was mounted a RFID-IC chip (I Code produced by Philips). In the mounting was used a flip chip mounting machine (FB 30 T-M produced by Kyushu Matsushita Electric Co., Ltd.). As the adhesive material for chip mounting, there was used an anisotropic conductive adhesive (TAP 0402E produced by KYOCERA Chemical Corporation), and thermocompression bonding was conducted under the conditions of 220° C., 1.96 N (200 gf) and 7 seconds, whereby an IC inlet was obtained.

Thereafter, an acrylic adhesive (PA-T1 produced by LINTEC Corporation) was coated, by a screen coater, on the release treatment-applied side of a release material (SP-8KX produced by LINTEC Corporation, obtained by coating a silicone-based resin on a glassine paper) so that the coating amount after drying became 25 g/m². This release material coated with the acrylic adhesive was laminated on the whole portion of the circuit-formed side of the substrate 2, to obtain an IC tag. Incidentally, the production of the IC tag was conducted in a continuous operation using a composite sheet wound into a roll shape. Thus was obtained a roll of 20 m in total length in which 500 pieces of IC tags each having a size of 35 mm×75 mm had been formed.

Confirmation of Operation of IC Tag

The confirmation of the operation of produced IC tag was conducted by a read/write test using an I Code evaluation kit (SLEV 400 produced by Philips).

The large number of IC tags produced above were cut into an individual tag size. Simultaneously therewith, a circular and broken line 28 of 17 mm in diameter was formed using a punching blade formed a broken line such as line of perforations formed by sewing machine. Thus, 20 peaces of IC tags were produced. The terminals for formation of the broken line 24 and 26 had each a length of 4 mm (corresponds to Q in FIG. 2), and the lengths (correspond to a and b in FIG. 1) of broken line portions formed in terminals for formation of the broken line 24 and 26 were each 13 mm.

In the broken line 28, the length Y of each uncut part 34: the length X of each cut part 32=1:3, and the length Y of each uncut part was 0.5 mm.

In forming a broken line in the terminals for formation of the broken line 24 and 26, if the processing accuracy is low, and the broken line may shift by 0.5 mm in any direction of plane, the above length of terminals for formation of the broken line 24 and 26 is such a length that the broken line is reliably inside the terminals. Actually, the broken line was made inside the terminals in all the IC tags produced. An adhesive layer 52 and a release material 54 were laminated on the substrate 2 and, for each resulting IC tag, reading and writing of data by radio wave was conducted using SLEV 400, whereby each IC tag was confirmed for operation as a RFID (radio frequency identification) circuit.

The release material was peeled from each IC tag and the adhesive layer 52 of the resulting IC tag was attached to a polypropylene resin plate. 24 hours later, the IC tag was peeled from the resin plate. As a result, the IC tags of 20 pieces were cut off along the broken line and the circuit of each IC tag was destroyed physically.

Example 2

20 pieces of IC tags were produced in the same manner as in Example 1 except that terminals for formation of broken line 24 and 26 were formed using a silver paste. The terminals for formation of broken line 24 and 26, formed with a silver paste were formed by screen printing, simultaneously with the formation of a jumper 12. An IC chip was mounted and each resulting IC tag was confirmed for RFID function in the same manner as in Example 1. Then, the IC tag was attached to a polypropylene resin plate. 24 hours later, the IC tag was peeled from the resin plate. As a result, the IC tags of 20 pieces were cut off along the broken line, the circuit of each IC tag was destroyed physically, and the RFID function was lost.

Example 3

Figure 4:
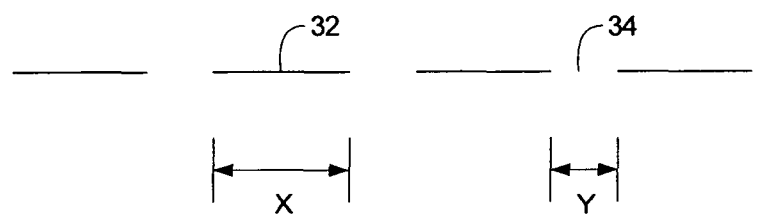
FIG. 4 is a view showing other example of broken line.

20 pieces of IC tags were produced in the same manner as in Example 1. However, as shown in FIG. 6, a rectangular terminal for formation of broken line 62 of 10 mm in length and 15 mm in width was formed in a lead 20, and a closed rectangular broken line 64 of 15 mm in length and 5 mm in width was formed so as to divide the terminal for formation of broken line 62 into two parts. Each side of the rectangular broken line 64 was consisted of four straight lines as shown in FIG. 4; and the length Y of each uncut part 34: the length X of each cut part 32=1:2, and the length Y of each uncut part was 0.5 mm.

In the same manner as in Example 1, there was laminated a release material coated, by a screen coater, with an acrylic adhesive at the release treatment-applied side, on the whole portion of the substrate 2 side on which a circuit was formed.

Each resulting IC tag was confirmed for RFID function. Then, the IC tag was attached to a polypropylene resin plate. 24 hours later, the IC tag was peeled from the resin plate. As a result, the IC tags of 20 pieces were cut off along the broken line and the circuit of each IC tag was destroyed physically.

Example 4

20 pieces of IC tags were formed in the same manner as in Example 1. In the same manner as in Example 1, an adhesive layer 72 was formed with an acrylic adhesive and a release material using a screen coater and then laminated on a substrate 2. However, as shown in FIG. 8, the adhesive layer 72 was formed only on the substrate portion on which a planar coil circuit portion 6 was formed and not on the substrate portion on which an IC chip 22, leads 14 and 20, and terminals for formation of broken line 24 and 26 were formed.

Each IC tag was confirmed for RFID function. Then, the IC tag was attached to a polypropylene resin plate. 24 hours later, the IC chip portion was pressed by a finger. As a result, cutting occurred along the broken line and all 20 pieces of IC chips could be recovered easily. The circuit was destroyed physically and the RFID function was lost.

Example 5

20 pieces of IC tags were produced in the same manner as in Example 1. However, as shown in FIG. 9, an adhesive layer 82 was formed on the whole substrate portion on which a planar coil circuit portion 6 was formed. Further, three, ribbon-shaped adhesive layers 84 of 5 mm in width and 15 mm in length were formed at intervals of 2 mm, in an area surrounding an IC chip 22. The adhesive layer 82 and the ribbon-shaped adhesive layers 84 were simultaneously formed with the same acrylic adhesive and release material as in Example 1, using a screen coater. Each IC tag was confirmed for RFID function. Then, the IC tag was attached to a polypropylene resin plate. 24 hours later, the IC tag was peeled from the resin plate. As a result, the substrate 2 was cut off easily along the broken line and the IC chip remained in a state that it was tentatively fitted to the resin plate. The IC chip in tentatively fitted state could be easily peeled from the resin plate and all 20 pieces of IC chips could be recovered easily. The circuit was destroyed physically and the RFID function was lost.

Example 6

20 pieces of IC tags were produced in the same manner as in Example 1. However, as shown in FIG. 10, an adhesive layer 102 was formed on the whole substrate portion on which a planar coil circuit portion 6 was formed. Further, two, rectangular, peripheral adhesive layers 104 and 106 (5 mm in width and 15 mm in length) were formed on the substrate 2 portion on which an IC chip 22, leads 14 and 20 and terminals for formation of broken line were formed, along the widthwise peripheries of substrate 2. The adhesive layers 102 and the peripheral adhesive layers 104 and 106 were simultaneously formed using the same acrylic adhesive and release material as in Example 1, using a screen coater.

Each IC tag was confirmed for RFID function. Then, the IC tag was attached to a polypropylene resin plate. 24 hours later, the IC tag was peeled from the resin plate while the IC chip portion was being pressed by a finger. As a result, cutting occurred easily along the broken line and all 20 pieces of IC chips could be recovered easily. The circuit was destroyed physically and the RFID function was lost.

Example 7

20 pieces of IC tags were produced in the same manner as in Example 1. However, as shown in FIG. 11, an adhesive layer 112 was formed on the whole substrate portion on which a planar coil circuit portion 6 was formed. Further, two, rectangular, peripheral adhesive layers 114 and 116 (5 mm in width and 15 mm in length) were formed on the substrate 2 portion on which an IC chip 22, leads 14 and 20 and terminals for formation of broken line were formed, along the widthwise peripheries of substrate 2. Further, a rectangular, end adhesive layer 118 (5 mm in width and 15 mm in length) was formed on the lengthwise end of substrate 2. Furthermore, two, ribbon-shaped adhesive layers 184 and 184 (5 mm in width and 15 mm in length) were formed so that an IC chip 22 was interposed between them.

The adhesive layer 112, the peripheral adhesive layers 114 and 116, the end adhesive layer 118 and the two, ribbon-shaped adhesive layers 184 and 184 were simultaneously formed using the same acrylic adhesive and release material as in Example 1, using a screen coater.

Each IC tag was confirmed for RFID function. Then, the IC tag was attached to a polypropylene resin plate. 24 hours later, the IC tag was peeled from the resin plate. As a result, the substrate 2 was cut off easily along the broken line and the IC chip remained in a state that it was tentatively fitted to the resin plate. The IC chip in tentatively fitted state could be easily peeled from the resin plate and all 20 pieces of IC chips could be recovered easily. The circuit was destroyed physically and the RFID function was lost.

Example 8

20 pieces of IC tags were produced in the same manner as in Example 1. In the same manner as in Example 1, an adhesive layer 122 was formed with an acrylic adhesive and a release material, using a screen coater and laminated on a substrate 2. The formed adhesive layer 122 is shown in FIG. 12. However, no adhesive layer was formed inside a closed area formed by a broken line (a closed area 30).

Each IC tag was confirmed for RFID function. Then, the IC tag was attached to a polypropylene resin plate. 24 hours later, the IC tag was peeled from the resin plate and, by pressing the IC chip portion by a finger, cutting occurred along the broken line and all 20 pieces of IC chips were recovered easily. The circuit was destroyed physically and the RFID function was lost.

Example 9

20 pieces of IC tags were produced in the same manner as in Example 1. An adhesive layer 132 was formed in the same manner as in Example 1. However, as shown in FIG. 13, no adhesive layer was formed in a closed area formed by a broken line (a closed area 30), except that, in the area, two, ribbon-shaped adhesive layers 284 and 284 of 5 mm in width and 15 mm in length were formed so that an IC chip was sandwiched by them.

The adhesive layer 132 and the two, ribbon-shaped adhesive layers 284 and 284 were simultaneously formed with the same acrylic adhesive and release material as in Example 1, using a screen coater.

Each IC tag was confirmed for RFID function. Then, the IC tag was attached to a polypropylene resin plate. 24 hours later, the IC tag was peeled from the resin plate. As a result, the substrate 2 was cut off easily along the broken line and the IC chip remained in a state that it was tentatively fitted to the resin plate. The IC chip in tentatively fitted state could be peeled easily and all 20 pieces of IC chips could be recovered easily. The circuit was destroyed physically and the RFID function was lost.

Example 10

20 pieces of IC tags having no adhesive layer were formed in the same manner as in Example 1 except that no adhesive layer was formed. On both sides of each IC tag was laminated a white polyethylene terephthalate film (125 μm in thickness) with a hot-melt adhesive, using a hot press, to obtain an IC card. Then, in the same manner as in Example 1, it was cut into 20 pieces of individual IC cards and, simultaneously therewith, a broken line 98 was formed in the vicinity of each IC chip, to obtain each IC card shown in FIG. 15. The broken line 98 penetrated through terminals for formation of broken line, a substrate, the polyethylene terephthalate film, etc.

Normal operation of 20 pieces of IC cards was confirmed. Then, each IC card was cut along the broken line to destroy the circuit. The destroyed card was examined for operatability. As a result, all 20 pieces of IC cards showed physical destruction and the function of each IC card was lost.

Example 11

An IC inlet shown in FIG. 5 was produced in the same manner as in Example 1. However, no broken line was formed. Separately, an acrylic adhesive (PA-T1 produced by LINTEC Corporation) was coated, by a screen coater, on the release treatment-applied side of a release material (SP-8KX produced by LINTEC Corporation, 80 μm in thickness, obtained by coating a silicone-based resin on a glassine paper) so that the coating amount after drying became 25 g/m$^2$. The adhesive-layer coated release material was laminated on the whole opposite side of the side which a circuit was formed in the inlet substrate.

An acrylic adhesive (PA-T1 produced by LINTEC Corporation) was coated on the back side of a white polyethylene terephthalate film (Crisper K 2411 produced by TOYOBO Co., Ltd., 50 μm in thickness) so that the coating amount after drying became 25 g/m$^2$. Then, this Crisper K 2411 was laminated on the whole surface of the substrate side on which a circuit was formed, to form a surface protective layer. Then, the same broken line as in Example 1, which surrounded an IC chip, was formed from the surface protective layer side so as to penetrate through the surface protective layer, terminals for formation of broken line, the substrate and the release material, to obtain an IC tag shown in FIG. 14.

In this IC tag, production number, etc. could be printed on the surface protective layer.

Comparative Example 1

20 pieces of IC tags were formed in the same procedure as in Example 1 except that no broken line was formed. They were confirmed for operation as a RFID circuit using SLEV 400, after which they were attached to a polypropylene resin plate. 24 hours later, they were peeled from the resin plate. As a result, in 19 pieces of IC tags, peeling was possible with no circuit destruction. 19 pieces of IC tags were examined for operation as a RFID circuit, which indicated normal operation. In one IC tag, circuit destruction occurred; however, it was presumed to be due to excessively high adhesive strength to polypropylene resin plate. Thus, the IC tags of Comparative Example 1 were insufficient in deactivation.

Comparative Example 2

20 pieces of IC tags were formed in the same procedure as in Example 1. However, a broken line was formed in the same manner as in Example 1 without forming any terminal for formation of broken line.

In 17 pieces of IC tags, when a broken line was formed using a punching blade, there occurred cutting of lead by the punching blade; as a result, these IC tags did not operate. In the remaining three IC tags, there occurred partial cutting of lead by the punching blade and there was significant reduction in communication distance; however, use as a RFID circuit was possible. The three IC tags were attached to a polypropylene resin plate and then peeled, which gave circuit destruction.

The invention claimed is:

1. An antenna circuit characterized by comprising:
   a substrate,
   a surface circuit consisting of a planar coil circuit portion and at least one pair of opposed electrodes connected to the planar coil circuit portion formed on the substrate,
   at least one terminal for formation of broken line, formed in a conductor constituting the surface circuit, and
   a broken line which penetrates through the substrate and the surface circuit and which has, in the terminal for formation of broken line, at least one uncut part passing through the terminal for formation of broken line.

2. The antenna circuit according to claim 1, wherein the conductor in which the terminal for formation of broken line is formed, is at least one pair of leads connecting each opposed electrode and the planar coil circuit portion, the terminal for formation of broken line is formed in the leads, and there is formed, in the terminal for formation of broken line, a closed broken line having at least one uncut part passing through the terminal for formation of broken line.

3. The antenna circuit according to claim 1, wherein the terminal for formation of broken line is formed in a shape having a dimension which can contain therein a circle having a diameter of at least 1 mm.

4. The antenna circuit according to claim 1, wherein the broken line has an uncut part having a length of 0.08 to 1.5 mm.

5. An IC inlet characterized by comprising:
   the antenna circuit set forth in claim 1, and
   an IC chip connected to the opposed electrodes of the antenna circuit.

6. An IC tag characterized by comprising:
   the IC inlet set forth in claim 5, and
   an adhesive layer formed on the side of which the surface circuit is formed on the substrate of the IC inlet, and/or on the opposite side.

7. The IC tag according to claim 6, wherein the adhesive layer is formed on the area other than the area in which the closed broken line is formed.

8. The IC tag according to claim 7, wherein the adhesive layer is formed on at least part of the area which is formed in the closed broken line.

9. The IC tag according to claim 6, wherein the adhesive layer is formed on at least the planar coil circuit portion area of the substrate and also on at least part of the periphery of the residual area of the substrate.

10. The IC tag according to claim 9, wherein the adhesive layer is formed on at least part of the closed broken line portion of the substrate.

11. An IC tag comprising:
    the IC tag according to claim 6, and
    a surface protective layer formed on the surface-circuit-formed side of the IC tag or on its opposite side,
    wherein the broken line penetrates through the surface protective layer.

12. The IC tag according to claim 11, wherein the surface protective layer has printability.

* * * * *